(12) United States Patent
Fitzer et al.

(10) Patent No.: US 7,219,619 B2
(45) Date of Patent: May 22, 2007

(54) SHOCK INDICATOR

(75) Inventors: Robert C. Fitzer, North Oaks, MN (US); G. Marco Bommarito, Stillwater, MN (US); Richard L. Crone, Woodbury, MN (US); Jeffrey W. McCutcheon, Baldwin, WI (US); Kevin W. Anderson, St. Paul, MN (US); Russell D. Birkholz, Maplewood, MN (US); Zhiming Zhou, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 5 days.

(21) Appl. No.: 10/517,685

(22) PCT Filed: Jun. 13, 2003

(86) PCT No.: PCT/US03/19014

§ 371 (c)(1),
(2), (4) Date: Dec. 10, 2004

(87) PCT Pub. No.: WO03/107015

PCT Pub. Date: Dec. 24, 2003

(65) Prior Publication Data

US 2005/0217558 A1    Oct. 6, 2005

Related U.S. Application Data

(60) Provisional application No. 60/388,684, filed on Jun. 14, 2002.

(51) Int. Cl.
*G01L 5/00* (2006.01)
(52) U.S. Cl. ..................................................... 116/203

(58) Field of Classification Search ................ 116/203, 116/212, 215
See application file for complete search history.

(56) References Cited

U.S. PATENT DOCUMENTS

| | | | | |
|---|---|---|---|---|
| 2,674,221 A | * | 4/1954 | Tinsley | 116/215 |
| 2,976,732 A | * | 3/1961 | Hautly | 116/203 |
| 3,021,813 A | * | 2/1962 | Rips | 116/203 |
| 3,312,188 A | | 4/1967 | Lode et al. | |
| 3,373,716 A | * | 3/1968 | Williams | 116/203 |
| 3,461,730 A | | 8/1969 | Peters | |
| 3,707,722 A | * | 12/1972 | Itoh | 116/203 |
| 3,782,204 A | * | 1/1974 | Boardman | 116/203 |
| 4,068,613 A | * | 1/1978 | Rubey | 116/203 |
| 4,125,085 A | * | 11/1978 | Rubey | 116/203 |
| 4,177,751 A | | 12/1979 | Rubey | |

(Continued)

FOREIGN PATENT DOCUMENTS

DE    19724440    12/1998

(Continued)

*Primary Examiner*—Richard Smith
*Assistant Examiner*—Travis Reis

(57) ABSTRACT

A shock indicator is described comprising (A) a base having a first side and a second side; (B) an indicator associated with the first side of the base, the indicator comprising a plurality of indicator subparts, the subparts comprising solid material arranged (i) in a first configuration when the shock indicator is in a first state prior to a shock event, and (ii) in a second configuration when the shock indicator is in a second state following a shock event; and (C) means associated with the second side of the base for attachment of the shock indicator to a surface. A method of manufacture is also provided.

5 Claims, 4 Drawing Sheets

U.S. PATENT DOCUMENTS

| | | | |
|---|---|---|---|
| 4,237,736 A | | 12/1980 | Wright |
| 4,239,014 A | * | 12/1980 | Rubey ...................... 116/203 |
| 4,361,106 A | * | 11/1982 | Eklof ....................... 116/203 |
| 4,982,684 A | * | 1/1991 | Rubey ...................... 116/203 |
| 5,238,623 A | | 8/1993 | Mrozinski |
| 5,551,279 A | * | 9/1996 | Quick ....................... 116/203 |
| 6,117,530 A | | 9/2000 | Jonza et al. |
| 6,272,901 B1 | | 8/2001 | Takeuchi et al. |
| 6,848,389 B1 | * | 2/2005 | Elsasser et al. ............. 116/203 |

FOREIGN PATENT DOCUMENTS

| | | |
|---|---|---|
| JP | 08 043425 | 2/1966 |
| JP | 2001 099854 | 4/2001 |

* cited by examiner

SHOCK INDICATOR

This application claims the benefit of U.S. Provisional Application No. 60/388,684, filed on Jun. 14, 2002.

FIELD OF THE INVENTION

The present invention relates to a shock indicator device, assemblies that include the shock indicator device, and a method for the manufacture of the shock indicator device.

BACKGROUND OF THE INVENTION

Shock indicators are devices that may be applied to other devices within any of a variety of different industries. Shock indicators are useful in detecting significant vibration or mechanical shock experienced by an associated device such as an electronic device, including hand held electronic devices. Cellular phones, personal digital assistants, hand held computers, battery chargers, small electric appliances, digital cameras (e.g., video and still cameras) are exemplary of devices that may be used in association with a shock indicator. Shock indicators may be placed on the electronic device in a suitable manner, either on the outer surfaces of the device or on an internal surface such as adjacent electronic components within the device, in the battery compartment or the like. If the electronic device experiences a severe shock as may occur if the device is dropped onto a hard surface from a significant height, the shock indicator should be activated to thereafter indicate the occurrence of the shock. Such information could be useful to a manufacturer and/or a service organization charged with repair or replacement of the device.

The vibration or shock history of an electronic device can be important. For example, recent developments in electronic equipment and components have provided a technological revolution in display technology. Previous monochrome displays made of polymeric film and the like have been relatively forgiving when mistreated or otherwise subjected to conditions of extreme handling (e.g., dropping or other shock inducing events). More recent developments in color displays have not yet evolved to such a level of durability. Many color systems still require glass panels which may be damaged when dropped or otherwise subjected to a shock force.

It would, therefore, be desirable to provide a shock indicator that can be affixed to or otherwise associated with a device, such as an electronic device including a cellular phone, a personal digital assistant, a hand held computer and the like. It would be especially desirable to provide such a shock indicator device in a construction that allows for activation of the indicator when an associated apparatus or device experiences a significant shock event, regardless of the direction of the force.

SUMMARY OF THE INVENTION

In one aspect, the invention provides a shock indicator, comprising:
(A) A base having a first side and a second side;
(B) an indicator associated with the first side of the base, the indicator comprising a plurality of indicator subparts, the subparts comprising solid material arranged (i) in a first configuration when the shock indicator is in a first state prior to a shock event, and (ii) in a second configuration when the shock indicator is in a second state following a shock event; and
(C) Attachment means associated with second side of the base for attachment of the shock indicator to a surface.

The subparts of the indicator may comprise material selected from the group consisting of toner powder particles, talc, flour, pigment, clay, ceramics, alumina, metals, and combinations of the foregoing, and the subparts may be surface modified. In another aspect, the subparts of the indicator may comprise a first size and the indicator may further comprise another component comprising a second subpart having a second size larger than the first subpart such as glass beads, for example. Typically, the shock indicator will also comprise a containment member disposed on the first side of the base and enclosing the indicator therein, the containment member being transparent, thereby facilitating the visual determination of the indicator in either its first or second configuration. The indicator and the first side of the base may be provided in different colors to provide a visual contrast therebetween.

In another aspect, the shock indicator may further comprise a differentiating component associated with the first side of the base the differentiating component comprising a film material to enhance the visual contrast between the differentiating component and the indicator. The differentiating component may comprise a first side and a second side and an annulus extending through the differentiating component from the first side to the second side, the indicator positioned within the annulus, at least one of the first side or the second side of the differentiating component comprising a structured surface. The structured surface may be a microstructured surface which is associated with the first side of the base to define a plurality of channels arranged in a predetermined pattern, the channels comprising an opening to permit the ingress of fluid when the indicator is in a second state. The microstructured surface typically comprises a regular array of precise structures having a shape selected from the group consisting of symmetrical shapes and asymmetrical shapes.

In still another aspect, the shock indicator may further comprise an impingement object within the containment member and positioned to impact the indicator during a shock event to aid in transitioning the indicator from the first state to the second state, the impingement object can be a material selected from the group consisting of glass beads, glass bubbles, ceramic beads, plastic beads, ball bearings and combination thereof.

In another aspect, the indicator comprises dry materials and the shock indicator further comprises means to indicate exposure to wetness.

In still another aspect, the indicator comprises an agglomerated powder in the first state prior to a shock event and a dispersed powder in the second state following a shock event, the indicator subparts comprising particles of the powder. Also, the indicator may comprise a solid (e.g., powder) and a liquid wherein the solid may be selected from the group consisting of exfoliated organophilic clay fillers, silica particles, glass particles, inorganic pigments, and combinations of the foregoing and the liquid at 23° C. has a surface tension within the range from about $10 \times 10^{-3}$ N/m to about $80 \times 10^{-3}$ N/m, a density from about 0.5 to about 2 grams/cm$^3$, and a zero rate shear viscosity from about $1 \times 10^{-3}$ to about $1 \times 10^6$ Pa-s. Some suitable fluids comprise liquids selected from the group consisting of silicone fluids and oils, saturated hydrocarbon-based oils, silicone gums, mineral oil, glycerols, water and combinations of the foregoing.

In still another aspect, the shock indicator further comprises a transmission layer positioned on the first side of the base between the base and the indicator, the transmission layer comprising a material to reduce, maintain or increase shock force transmitted to the indicator during a shock event. In other aspects the transmission layer comprises a viscoelastic material having a storage modulus of at least about 1.0 psi ($6.9 \times 10^3$ Pascals) and a loss factor of at least about 0.01 at the temperature and frequency at which the shock indicator is used.

In still another aspect the invention provides an assembly comprising the above mentioned shock indicator associated with an electronic device selected from the group consisting of cellular telephone, personal digital assistant, and hand held computers.

In another aspect, the invention provides a method for the manufacture of a shock indicator, comprising:
(A) providing a base comprising a first surface and a second surface, the second surface of the base associated with an attachment means; and
(B) placing an indicator in association with the first surface of the base, the indicator comprising a plurality of indicator subparts, the subparts comprising solid material arranged (i) in a first configuration when the shock indicator is in a first state prior to a shock event, and (ii) in a second configuration when the shock indicator is in a second state following a shock event.

The step of placing an indicator in association with the first surface of the base may further comprise placing a plurality of indicators in association with the first side of the base, each indicator comprising a plurality of indicator subparts, the subparts comprising solid material arranged (i) in a first configuration prior to a shock event, and (ii) in a second configuration following a shock event.

In another aspect, placing an indicator in association with the first surface of the base is accomplished by screen printing the indicator onto the first surface.

In still another aspect, the invention provides the foregoing method and further comprises placing a containment member over the first side of the base and over the indicator, the containment member being transparent, thereby facilitating the visual determination of whether the indicator is in the first configuration or the second configuration.

In still another aspect, the invention provides the foregoing method and further comprises providing a differentiating component associated with the first side of the base the differentiating component comprising a first side and a second side and an annulus extending through the differentiating component from the first side to the second side, one of the first side or the second side comprising a structured surface; and placing an indicator in association with the first surface of the base further comprises placing the indicator within the annulus. The structured surface can comprise a microstructured surface associated with the first side of the base, the microstructured surface comprising a regular array of precise structures having a shape selected from the group consisting of symmetrical shapes and asymmetrical shapes, the precise structures defining a plurality of channels arranged in a predetermined pattern, the channels comprising an opening to permit the ingress of fluid within the channels when the indicator is in a second state.

In another aspect, the method will also comprise providing a means for attaching the indicator to another surface such as by an adhesive or a mechanical fastener, for example, herein the means for attaching may comprise a material to reduce, maintain or increase shock force transmitted to the indicator during a shock event.

In still another aspect, the invention provides the foregoing method and further comprises providing a transmission layer in association with the first side of the base between the base and the indicator, the transmission layer comprising a material to reduce, maintain or increase the shock force transmitted to the indicator during a shock event.

In still another aspect, the invention provides the foregoing method and further comprises associating an electronic device with the shock indicator, the device selected from the group consisting of cellular telephone, personal digital assistant and hand held computer.

Additional details of the invention will be more fully appreciated by those skilled in the art upon further consideration of the remainder of the disclosure, including the detailed description of the preferred embodiment in conjunction with the various figures herein and the appended claims.

BRIEF DESCRIPTION OF THE DRAWINGS

In describing the preferred embodiment of the invention, reference is made to the various figures in which the features of the preferred embodiment are generally designated by reference numerals and wherein like reference numerals indicate like structure, wherein.

DETAILED DESCRIPTION OF THE PREFERRED EMBODIMENT

The present invention provides a shock indicator suitable for use on any of a variety of shock-sensitive machines, electronic components, electronic equipment or other devices that may be subjected to inertial and vibrational forces during use. The shock indicator device of the present invention provides a passive means to determine whether an associated apparatus or the like has been subjected to a mechanical shock event. The shock indicator device of the invention is initially provided in a non-activated condition and is transitioned to an activated condition upon the application of sufficient force or shock caused by, for example, the deceleration of an associated device dropped onto a floor or other hard surface from a significant distance.

Various features and embodiments are contemplated within the scope of the invention and are generally described below.

Figure 1:
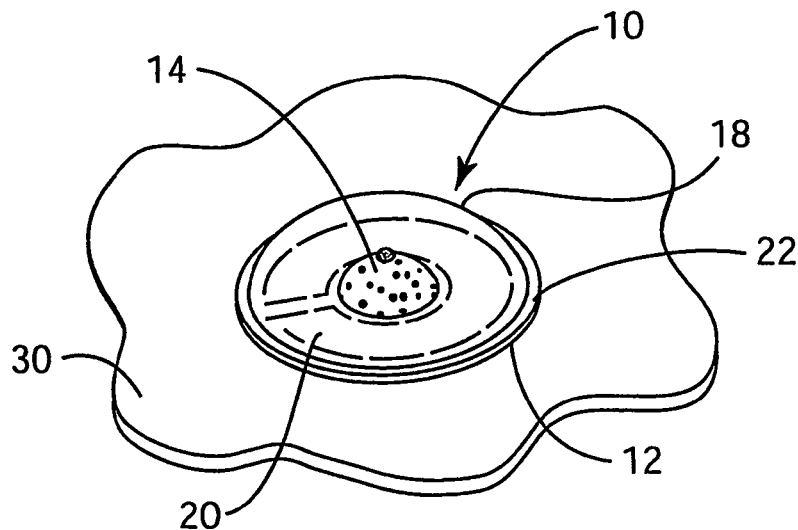
FIG. 1 is a perspective view of one embodiment of a shock indicator according to the present invention.
Figure 2:
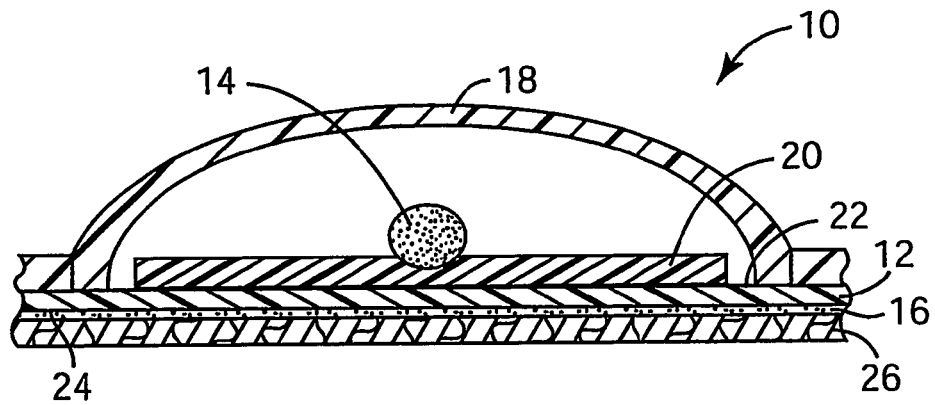
FIG. 2 is a cross sectional side elevation view of the shock indicator of FIG. 1.

Referring now to the drawings, FIGS. 1 and 2 show a shock indicator 10 according to the present invention. The shock indicator 10 may be affixed to a surface 30 (see FIG. 1) of another device, as mentioned herein. The shock indicator 10 includes a base member 12 having a first side 22 and a second side 24. The first and second sides 22 and 24 of the base member 12 comprise, respectively, the first and second major surfaces of the base member 12. An indicator 14 is associated with the first side 22 of the base 12. As shown, the indicator 14 can comprise a spherically configured agglomerated powdered material. The indicator member 14 may comprise a colored powder and/or one or more coloring agents to provide the indicator 14 with a visually discernable appearance. If desired, portions of the indicator 14 may be provided in one or more colors while other portions of the indicator 14 may be provided in another color or colors.

The indicator 14 is an agglomerated powder which, when so agglomerated, indicates a first or non-activated configuration prior to the occurrence of a shock event. In the depicted embodiment, a domed containment member 18 is provided over the first side 22 of the base member 12 and enclosing the indicator 14. As is described below, at least a portion of the domed containment member 18 is typically transparent in order to facilitate the visual observation of the indicator 14. The containment member 18 functions to protect the agglomerated powder material of the indicator 14 from prematurely dispersing or smearing due to handling, incidental bumping, and the like. It will be appreciated that, in some embodiments, the containment member 18 may be considered an optional component such as when the shock indicator 10 is incorporated within a device that includes a structure or structures equivalent to containment member 18, or where the indicator 14 is bound together in sufficient strength to withstand smearing or activation during the normal and expected use of the associated device. Additionally, the containment member may be provided in any of a variety of shapes and sizes as may be required due to spatial constraints in a particular application or as may be desired for any other reason. An attachment means 16 is also provided and is associated with the second side 24 of the base member 12. In the depicted embodiment of the shock indicator 10, the attachment means 16 is a pressure sensitive adhesive. Other means for the attachment of the devices of the invention to a surface are also contemplated as within the scope of the invention.

It should be appreciated that the design and material selection for the attachment means 16 may affect the level of force that actually acts upon the indicator 14 and the associated parts of the shock indicator device 10. The indicator 14 will respond to a level of force that causes the subparts of the indicator 14 to disperse. The shock event can lead to shear, compression, tensile, peel or cleavage stress forces acting on the indicator and on the attachment means. The shock stresses imparted through, into or onto the indicator 14 will exceed the structural strength of the indicator 14 and/or the attachment means, causing the structure of the agglomerated indicator 14 to collapse, fail, breakapart, disintegrate, implode, explode, disperse or change to thus indicate that a significant shock event has occurred. In the embodiment of FIG. 2, a release liner or liner material 26 may be provided to protect the adhesive surface of the attachments means 16 prior to the shock indicator 10 being applied to a surface.

In the embodiment of FIG. 2, a release liner or liner material 26 may be provided to protect the adhesive surface of the attachments means 16 prior to the shock indicator 10 being applied to a surface.

An additional differentiating component 20 is may be provided over at least a portion of the first surface 22 of the base member 12. The differentiating component 20 may comprise a film material overlying the first side 22 of the base member 12. Most typically, the differentiating component 20, when present, is provided with a suitable surface color to enhance the visual contrast between the differentiating component 20 and the indicator 14. In this manner, the activation of the indicator 14 is more readily observable where the contrast between the indicator 14 and the differentiating component 20 have been selected to facilitate the visual determination of the activation state of the indicator 14. Alternatively, the base 12 can be provided as a colored film to provide the same color contrast effect in conjunction with the color selected for the indicator 14.

Figure 3:
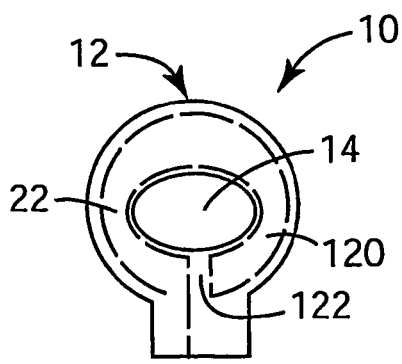
FIG. 3 is a top plan view of the shock indicator of FIG. 1 in a first state prior to a shock event.
Figure 4:
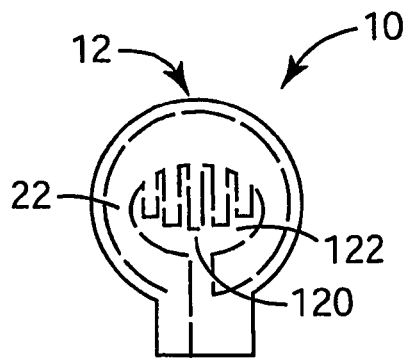
FIG. 4 is a top plan view of the shock indicator of FIG. 1 in a second state following a shock event.

Referring to FIGS. 3 and 4, the shock indicator 10 may comprise an additional component in the form of a conductive layer 122 configured to act as a circuit upon the application of charge thereto. The conductive layer 122 is constructed of a conductive metal or other material capable of providing an electrostatic charge to powder particles positioned within the innermost portion of the differentiating component 20. The presence of a conductive layer 122 provides a means by which the powdered indicator 14 may be agglomerated during the manufacture of the shock indicator 10 by providing sufficient electrostatic charge to coalesce individual powder particles into a cohesive mass to thereby form the spherically agglomerated indicator 14 in a first configuration or first state prior to the occurrence of a shock event.

Referring to FIG. 4, the shock indicator 10 is depicted following activation due to a shock event. Accordingly, the subparts (e.g., powder particles) of the indicator 14 are in a second configuration dispersed across differentiating component 120 on the first side of the base member 12, thereby visually exposing more of the conductive layer 122. The conductive layer 122 of the shock indicator 10 provides one manner by which the powdered indicator 14 may be agglomerated in an appropriate position to indicate a first state for the shock indicator prior to a shock event. It will be appreciated by those skilled in the art that other means are available to provide an agglomerated powder indicator, some of which are described herein. The present invention is not to be limited in any way by the use of a conductive layer 122. For example, a binder composition and/or a diluent liquid may be mixed with an appropriate powder suitable for use as an indicator. The diluent liquid may be any of a variety of suitable organic liquids, especially those capable of wetting the powder and thereby displacing entrapped air. Most typically, such a diluent liquid or binder will be selected so as to hold the powder in an agglomerated state for a period long enough to position the indicator in a first configuration within the shock indicator. Thereafter, the diluent liquid may be evaporated and the binder used, if any, will not be of sufficient strength to prevent the powdered indicator from dispersing to a second configuration following a shock event.

Figure 5:
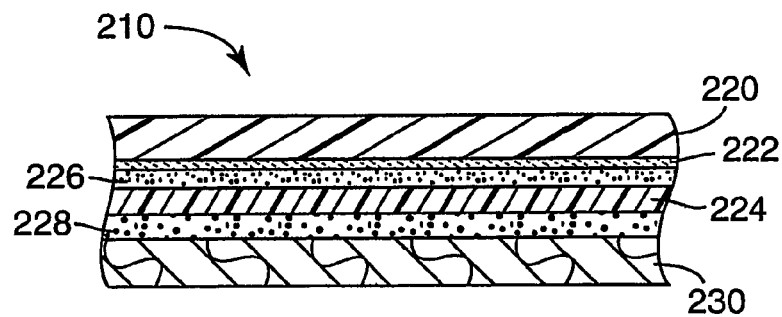
FIG. 5 is a side elevation view of a material useful as a base in the shock indicator of the present invention.

A principal starting material for the manufacture of the shock indicator comprises a web 210, depicted in FIG. 5. The web 210 may compromise a multilayered film or a number of different film and adhesive layers associated with one another. A number of film layers may be desired or needed to support the indicator and the containment member, if present. Additionally, one or more adhesives or other attachment means may be utilized to adhere the layers of the web 210 to one another as well as providing an attachment means for affixing the shock indicator to another device. In the depicted embodiment of the web 210, differentiating component layer 220 overlies silicone release coating 222. The differentiating layer 220, when present, may be colored where it is desirable to provide a visual contrast with the indicator in the finished shock indicator. Release coating 222 is provided as a convenience during the manufacture of the shock indicator to facilitate the removal of excess background film 220 when the web 210 is used to make a plurality of shock indicators. In this manner, the excess background film 220 may be removed as "weed" in the manner described below.

A polymeric backing 224 is provided as a film associated with the silicone release coating 222 by an adhesive layer 226 disposed along a major surface of the polymer film backing 224. Along the opposite side of the polymer film backing 224, another layer of adhesive 228 provides an attachment means for affixing the finished shock indicator to the surface of another device or the like. Release liner 230 may overlay the surface of the adhesive 228 to at least temporarily protect the surface of the adhesive layer 228.

Figure 6:
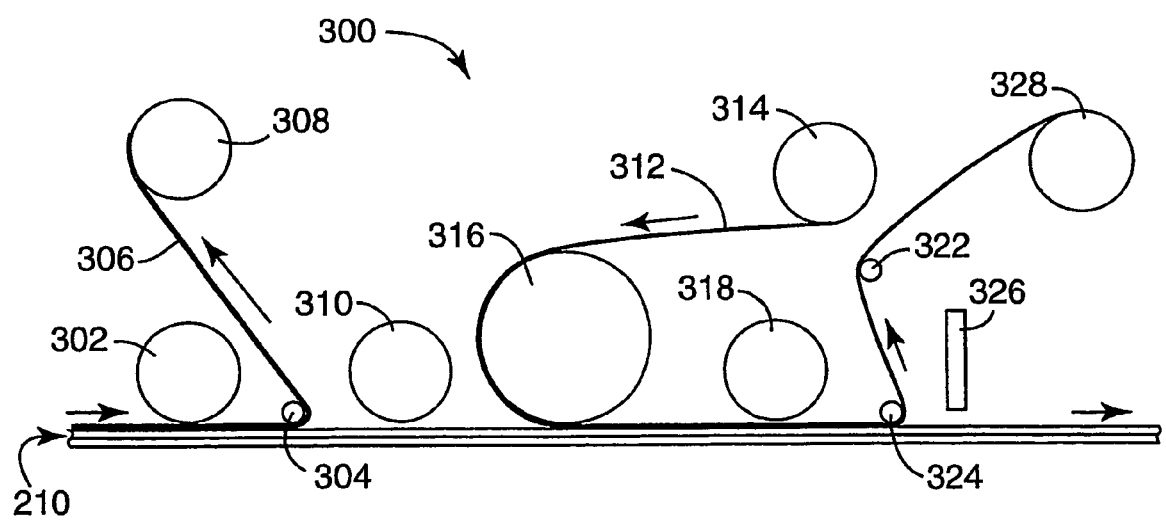
FIG. 6 is a schematic illustrating a method for the manufacture of the shock indicator of the present invention.

Referring now to FIG. 6, a process for the manufacture of the shock indicator of the present invention will be described. The aforementioned web 210 is conveyed along a converting line 300. A first rotary die 302 is positioned along the converting line 300. The die 302 is configured to cut a plurality of circular base members in the web 210. It will be appreciated that the configuration of the shock indicator, although depicted herein as circular, may comprise any of a variety of shapes and sizes including circular, square, rectangular, oval, polygonal, and the like. Following die cutting by rotary die 302, the web 210 advances along the converting line to roller 304 where the unneeded portions of the layer 220 (see FIG. 5) are removed as "weed" 306 which is directed to take up roll 308, leaving the web 210 to comprise a top layer of circular background film 220 that will serve as a differentiating component in an article of the invention.

In this embodiment, a rotary screen printing roll 310 is positioned along the web converting line 300 to screen print the powdered indicator onto the die cut circular portions on the web 210. The use of a rotary screen printing process for the deposition of indicator materials is typically accomplished using a suitable indicator material mixed with an appropriate amount of a binder material and/or diluent liquid. Such materials may comprise materials that are not normally considered as binders in many applications. For purposes of the present invention, suitable binders include mineral oil, for example, as well as other solvents or materials that will aid in the agglomeration of the indicator material without evaporating. Additionally, organic (e.g., hydrocarbon) liquids may be added to the binder to facilitate the formation of a slurry that can then be deposited, printed or otherwise placed on the base member. A diluent liquid may also be an active solvent for a binder without being a solvent for the indicator material. In this manner, a diluent liquid can assist in initially holding the indicator powder materials to each other. Following the deposition of a slurry onto the base member or web 210, the liquid is allowed to evaporate while the binder remains associated with the powder and continues to hold the agglomerated powder in a cohesive mass until it is disturbed by a shock event. Additionally, the foregoing diluent liquids may be used without binder so that, following the evaporation of the liquid, the powdered agglomerate is maintained in a cohesive mass by electrostatic attraction or van der Waals forces. Other embodiments of the indicator as well as the other features of the shock indicator of the invention are also contemplated, and at least some of those are described herein including indicators that incorporate liquids with powder particles and those that incorporate solid materials other than powder particles or solid materials (other than powder particles) that are used with powder particles, for example. The present invention is not to be construed as limited to any particular indicator composition or construction other than those constructions that are capable of transitioning from a first configuration to a second configuration in response to a shock event. Moreover, the construction of the shock indicator device of the invention can be customized in order to provide the device with a sensitivity to shock events of a certain threshold value or minimum magnitude.

In various embodiments, a containment member will be placed over the aforementioned backing pieces and indicator materials. The containment material 312 is typically a polymeric material. Suitable materials for the containment material include materials capable of being vacuumed formed such as polycarbonate, polystyrene, polyolefin, acrylic polymers and also polyester polymers and copolymers. The containment material 312 is supplied from feed roll 314 to the vacuum forming roll 316. As mentioned, the containment member may be supplied as a dome or in some other configuration. In the depicted process, the configuration of the containment structure is formed on a forming roll 316 and thereafter applied over the above-described based members and the rotary screen printed indicator materials. The containment material 312 is applied over the backing material and is affixed thereto by adhesive layer 226 (FIG. 5) provided as a layer of the web material 210. A second rotary die 318 is provided to die cut through the containment material 312 and the remaining layers of the web 210 so that individual shock indicators are thereby formed and are carried on a common backing. The backing may comprise a liner 230 to hold all of the shock indicators on a sheet until further cutting or slitting of the web 210 occurs. The "weed" from the containment material 312 is then taken up on take up roll 328. In the depicted embodiments, the take up roll 328 picks up the weed from the conveyor line with guide rolls 322 and 324 to guide the weed to the take up roll. A slitter 326 is then provided to slit the web 210 into elongate strips having a plurality of shock indicator buttons aligned thereon in a longitudinal manner. These longitudinal strips may then be further cut or packaged, as desired for convenient dispensing or for automated dispensing such as from a dispenser fitted with a magazine cartridge.

Regarding materials, the base 12 (FIGS. 1 and 2) may comprise any of variety of suitable materials such as polymeric film materials, woven and nonwoven materials, paper, spun bonded materials and the like. The indicator material is typically comprised of a solid material that further comprises a number of solid indicator sub-parts. Most typically, the indicator material is a powder material capable of forming an agglomerated mass. Suitable materials for the indicator include conventional toner powders, talc, flour, pigments, clays, ceramic powders (boron nitride, silicon carbide, alumina, etc), spherical alumina, powered metals, other finely ground materials and the like. The powders particles can be surface modified with various chemical treatments or coatings to modify their agglomerating ability and/or to improve mixing, compounding and/or delivery to a location. The powders or particulates can be provided in any of a variety of shapes, such as platelets, spherical, pole like all with various feature aspect ratios. The powder or particulate component can be hollow, porous, solid or a mixture of these. Combination of these features permits unique blending of particles and powders with optional larger particles and polymer or resin matrixes. The agglomerates can also be made using larger "seed" bodies or a resin starved matrix design comprising particles or beads such as glass bubbles or microbubbles and the like. When seed bodies are used, the smaller powder particles will be attached to or associated with the larger seed particle to form an agglomeration of the smaller particles around the larger seed bodies.

Other materials are also mentioned herein in the discussion of individual embodiments, and it is not intended that the invention be limited to any particular selection of materials for the indicator.

Regarding the attachment means, any of a variety of materials may be used to affix the shock indicators of the present invention to the surface of another device or apparatus. Adhesives as well as reclosable fasteners such as hook and loop components, and mechanical fasteners such as snaps, hooks, clips, clamps, and rivets may be used in affixing the shock indicator of the invention to a device such as, for example, a cellular telephone, a hand held computer, or the like. Adhesives suitable for use as the attachment means may be selected from any of a variety of adhesive materials such as pressure sensitive adhesives, thermally bonded adhesives (e.g., hot melts), ultra-violet activated adhesives, room temperature curable adhesives, cold seal adhesives, self fusing adhesives, epoxies, thermoplastics, thermosets and the like. Typically, pressure sensitive adhesives are used to adhesively bond the shock indicator to a device.

It will be appreciated that the selection of the specific attachment means may take into account how the attachment means will affect the shock indicator's response to a shock event. Different attachment means can effect how the indicator will respond to a shock event. For example, the attachment means can provide damping and/or isolation to the shock indicator. The geometry of the attachment means (e.g., whether it is a solid material, has holes or other cut-outs, and its thickness, width, and/or length), its configuration, materials used, modulus, and the like can effect the properties of the attachment means such as the stiffness, softness or spring constant and the resultant damping can change how the shock indicator responds to a shock event. A soft and low modulus attachment means (such as a double coated foam) win change how a shock indicator responds to a same shock event as compared with a stiff, high modulus attachment means (such as an epoxy adhesive with a high modulus or high glass transition temperature, Tg). A pressure sensitive adhesive (PSA) can have a degree of damping and isolation performance depending on the polymer's Tg and the application geometry used. Moreover, different pressure sensitive adhesives (or other attachment means) can change the transmissibility of the same shock force.

Pressure sensitive adhesives generally possess (1) aggressive and permanent tack, (2) adherence to a substrate upon the application of finger pressure, (3) the ability to hold onto a substrate or adherend and (4) sufficient cohesive strength to be substantially cleanly removed from the adherend for ease of rework. Additives may be added to the pressure sensitive adhesive to impart and/or improve these properties. Suitable pressure sensitive adhesives will typically include the foregoing properties and the actual attachment means used in the shock indicator of the invention may comprise a single pressure sensitive adhesive or a combination of adhesives. Suitable pressure sensitive adhesives include those based on natural rubbers, synthetic rubbers, styrene block copolymers, polyvinyl ethers, poly(meth)acrylates, polyolefins and silicones, for example. Tackifiers may be added to the adhesive for improved tack. Suitable tackifiers may comprise rosin ester resins, aromatic hydrocarbon resins, aliphatic hydrocarbon resins and terpene resins. Oils, plasticizers, antioxidants, UV stabilizers, hydrogenated butyl rubber, pigments, curing agents and combinations thereof may also be found in the pressure sensitive adhesive useful herein.

A useful pressure sensitive adhesive may be based on at least one poly(meth)acrylate derived from, for example, at least one alkyl(meth)acrylate ester monomer such as isooctyl acrylate, isononyl acrylate, 2-methyl-butyl acrylate, 2-ethyl-hexyl acrylate and n-butyl acrylate; and at least one co-monomer component such as (meth)acrylic acid, vinyl acetate, N-vinyl pyrrolidone, (meth)acrylamide, vinyl ester, fumarate, styrene macromer, or combinations of the foregoing. A suitable poly(meth)acrylate for use in the invention may be derived from about 0 to about 30 wt. % acrylic acid and about 100 to about 70 wt. % of at least one of isooctyl acrylate, 2-ethyl-hexyl acrylate or n-butyl acrylate. More typically, the suitable poly(meth)acrylate is derived from about 2 to about 10 wt. % acrylic acid and between about 90 and about 98 wt. % of at least one of isooctyl acrylate, 2-ethyl-hexyl acrylate or n-butyl acrylate.

Figure 7:
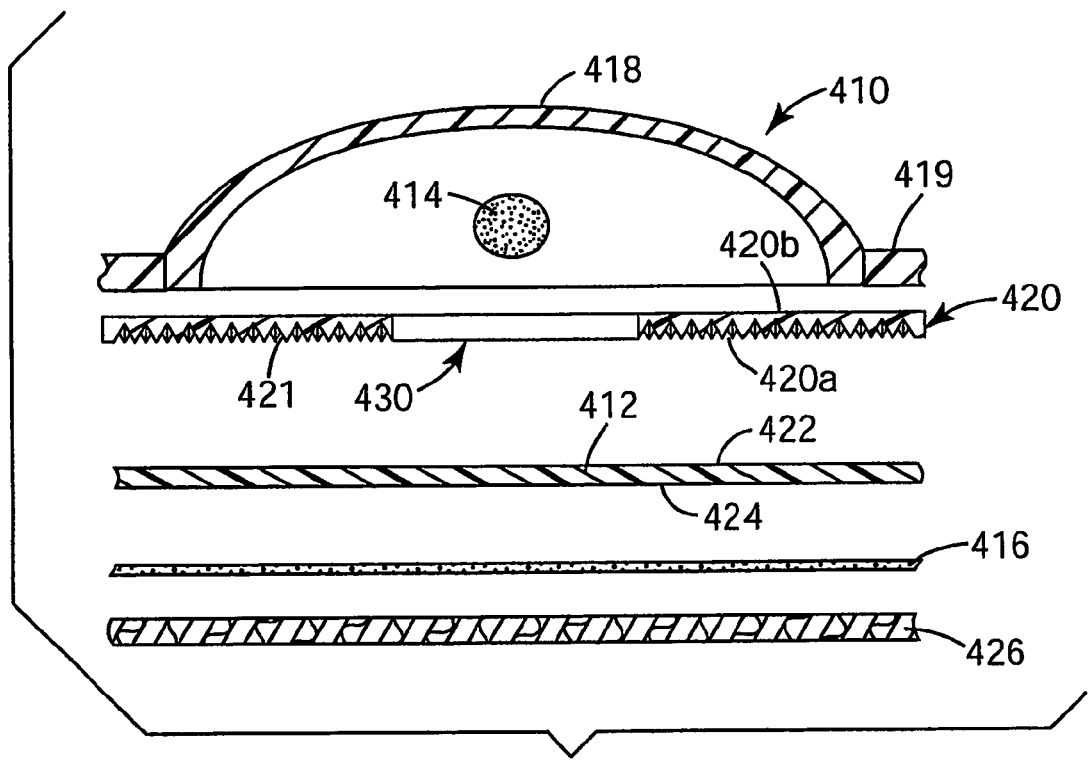
FIG. 7 is an exploded view, in a side elevated cross section, of another embodiment of a shock indicator according to the present invention.
Figure 8:
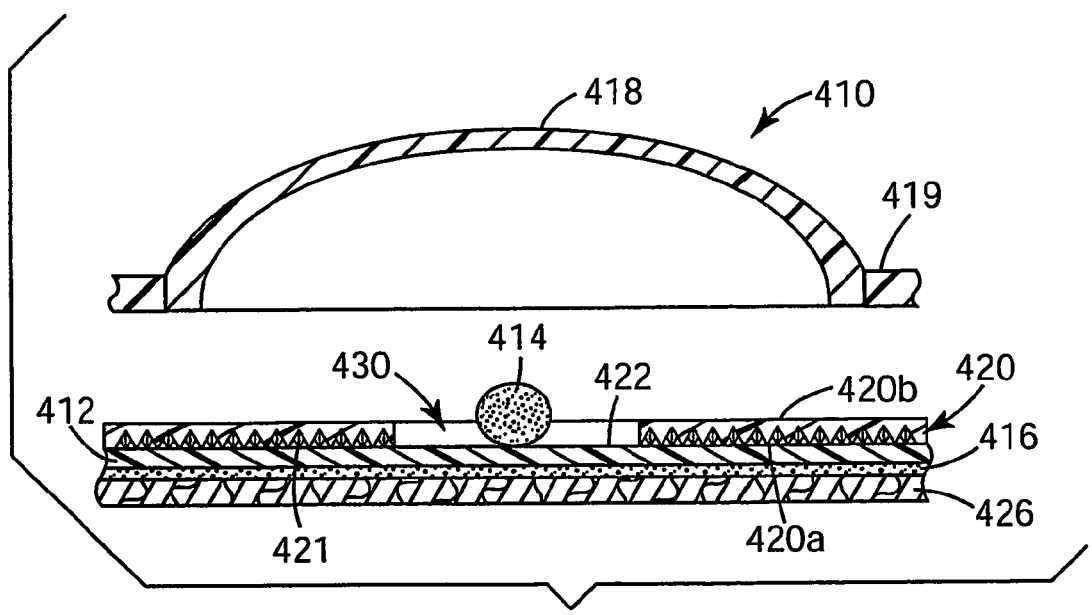
FIG. 8 is a cross sectional side elevation view of the shock indicator of FIG. 7 in a first state prior to a shock event.
Figure 9:
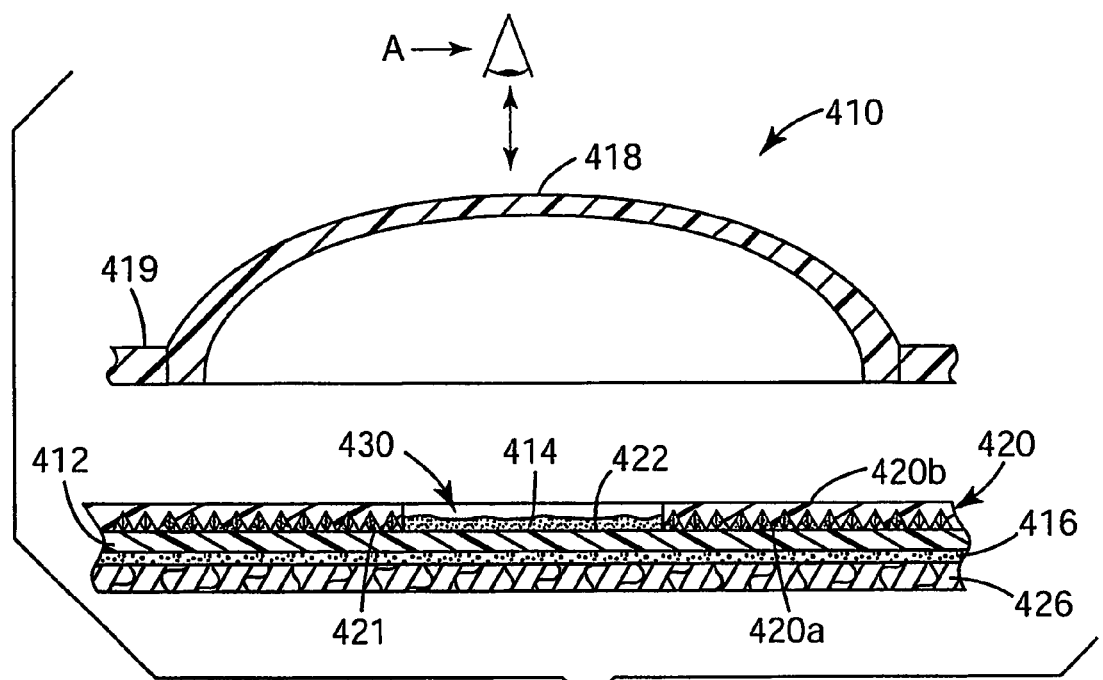
FIG. 9 is a cross sectional side elevation view of the shock indicator of FIG. 7 in a second state following a shock event.

Referring generally to FIGS. 7, 8 and 9, a shock indicator 410 according to another embodiment of the invention is shown and will now be described. The shock indicator 410 comprises a base member 412 having a first side 422 and a second side 424. The first and second sides 422 and 424 of the base member 412 comprise, respectively, the first and second major surfaces of the base member 412. An indicator 414 is associated with the first side 422 of the base 412. In the embodiment of the invention illustrated in FIGS. 7 and 8, the indicator 414 comprises a liquid in addition to the solid materials previously described herein. It is contemplated that the indicator 414 may comprise, for example, a suspension of exfoliated organophilic clay fillers or the like dispersed in a liquid phase material such as, for example, mineral oil. One suitable combination of materials for the indicator 414 is exfoliated organophilic clay dispersed in mineral oil at about 16% by weight. Other materials are described below.

The indicator 414 depicted in FIGS. 7 and 8 is in a first configuration prior to the occurrence of a shock event. Domed containment member 418 covers the first side 422 of the base member 412 and the indicator 414. Differentiating component 420 is provided over at least a portion of the first surface 422 of the base member 412. In this embodiment, the differentiating component 420 comprises sheeting or material having optical properties that enable a viewer of the material to readily witness changes in color caused by liquid released from the indicator 414 as it travels along surface 422. Suitable materials for this application are discussed herein.

In this embodiment, the differentiating component 420 is typically cut (e.g., die cut) in an annular shape to surround the indicator 414 within annulus 430 in which the indicator 414 nests when the indicator is in its first configuration prior to a shock event. The differentiating component 420 is provided with both a structured surface 420a and a non-structured surface 420b. The non-structured surface 420b may be laminated to, adhesively affixed to, or otherwise associated with the domed containment member 418. The structured surface 420a of the component 420 is textured, and typically comprises a microstructured surface, wherein the microstructured surface defines a plurality of channels 421 with a predetermined channel pattern when the surface 420a is laminated to the base member 412. The maximum depth and width of the channels is typically less than about 1,000 microns. The channels may or may not be interconnected. The channels may, optionally, be formed from a series of projections on the surface 420a. The description of the surface 420a is not meant to exclude webs, fabrics, porous materials, porous papers, porous membranes, etc., which may have channels, but which may be considered as not being of a predetermined pattern. Typically, the channel portion of the substrates of the invention is regular, orderly, and non-random, and the channels are in an array. In some embodiments, each channel would be substantially identical or identical to an adjacent channel. In some embodiments, one may wish to have differing channel geometries and/or sizes, either widthwise across the channel surface or lengthwise down the channeled surface.

The substrates comprising the optical differentiating component 420 may be flexible, and therefore easier to attach to an intended surface. However, semi rigid and rigid substrates also may be useful according to the invention. The differentiating component 420 may or may not be retroreflective depending on the particular embodiment. Examples of useful non-retroreflective substrates include, but are not limited to, microstructured substrates. The use of a retroreflective microstructured substrate may provide a number of advantages to the articles of the invention such as providing a highly visible fluid flow front in which the fluid frustrates total internal reflection in the retroreflective substrate. It will also be appreciated that the differentiating component may be provided with dual textured surfaces or dual smooth surfaces (e.g., differentiating component 20, FIGS. 1 and 2) as may be desired for a particular application of the shock indicator of the invention.

The flow of the fluid through the microchannels is generally passive in that it is typically accomplished via capillary action. Gravitational effects may also influence the flow of fluid to at least a minor extent. The microstructured surface of the differentiating component can comprise different shapes including symmetrical or asymmetrical shapes such as, for example, rectangular, square, trapezoidal, ring, triangular, etc. Optionally, markings (not shown) may be placed on the shock indicator 410 to indicate the magnitude of a shock event. The markings may, for example, be placed along the surface 419 of the containment member 418 at calibrated intervals. Such markings may or may not be evenly spaced depending on the construction of the microstructured surface 420a and the channels created thereby. Typically, the channel openings are located on at least one edge or side of a substrate and the channels extend through the entire substrate surface to another end or edge of the substrate (typically an opposite end or edge). The channels 421 may be interconnected to promote a more even fluid flow front.

Although the channels 421 may be provided using a textured surface 420a laminated to a relatively flat surface of the base member 412, it is also possible to provide channels that are internal to the substrate by joining together two microstructured surfaces to provide channels that will accommodate a desired fluid flow. The resulting substrate may or may not be retroreflective depending on the patterns joined together. These sheets can be held together by a variety of means including adhesives, hot-melt bonding, and the like. Depending on the substrate shape and channel design, it may be desirable to seal the edges or sides of the substrate to prevent leakage of fluid therefrom. The channels of the microstructured substrate can have a variety of shapes. Typically the channels within the substrate are similarly shaped. Examples of useful channel cross-sectional shapes include, but are not limited to, the following: v-shaped channels, u-shaped channels, semi-circle-shaped channels, and square u-shaped channels. The channels when viewed from above, can be linear or non-linear. For example, they may be straight, curved, twisted, crooked, tortuous, etc. The channels may optionally be formed by a series of geometric projections, wherein the paths between the projections become the channels. This would be the case for retroreflective cube-corner sheeting discussed later herein. Preferably the channels of the substrate are planar.

The depth of the channels normally will range from about 5 to less than about 1,000 microns, typically from about 10 to about 500 microns, more typically from about 25 to about 200 microns, and often from about 25 to about 100 microns. The width of the channels normally range from about 5 to about less than about 1,000 microns, typically from about 10 to about 500 microns, more typically from about 25 to about 250 microns. The spacing of the channels is such that a channel is generally within about 5 to less than about 1,000 microns of another channel, typically from about 10 to about 500 microns, and often from about 10 to about 250 microns. The shape, length, and number of channels on the substrate can vary depending on a number of factors such as the length of time desired for the fluid to run through the substrate, the particular fluid to be used with the substrate. A microstructured substrate tends to retain its geometry and surface characteristics upon exposure to the fluids used in the articles of the invention. One suitable material is a retroreflective diamond grade sheeting available from 3M Company under the designation "DG307."

Examples of useful non-retroreflective substrates include, but are not limited to, those disclosed in U.S. Pat. No. 5,728,446 (Johnston) and U.S. Pat. No. 5,514,120 (Johnston). These substrates provide for liquid management films that facilitate desired rapid and uniform anisotropy or directionally dependent distribution of liquids and absorbent articles using these films. These liquid management film have at least one microstructured surface with a plurality of primary grooves to promote the unidirectional spreading of the liquids. These primary grooves may also contain secondary grooves as in U.S. Pat. No. 5,728,446.

The microstructured flow channels of non-retroreflective microstructured substrates are, in some embodiments, substantially parallel and linear over at least a portion of their length. The channels can be easily formed from thermoplastic materials by casting, profile extrusion or embossing, preferably by casting or embossing.

The non-retroreflective microstructured substrates are preferably formed from any thermoplastic materials suitable for casting, profile extrusion, or embossing including, for example, polyolefins, polyesters, polyamides, poly(vinyl chloride), polymethyl methacrylate, polycarbonate, nylon, etc. Polyolefins are often used, particularly polyethylene or polypropylene, blends and/or copolymers thereof, and copolymers of propylene and/or ethylene with minor proportions of other monomers, such as ethylene/vinyl acetate. Polyolefins have excellent physical properties, are relatively easy to process, and typically are lower in cost than other thermoplastic materials having similar characteristics. Moreover, polyolefins readily replicate the surface of a casting or embossing roll and are also readily profile extruded. They are tough, durable and hold their shape well, thus making such films easy to handle after the casting or embossing process. Alternatively, the microstructured substrate can be cast from curable resin materials such as acrylates or epoxies, and cured by exposure to heat, ultra-violet (UV), or E-beam radiation. Most likely, the microstructured substrates having retroreflective and/or other optical properties discussed in greater detail below can also be made by the procedures described above.

Another class of microstructured substrates useful in embodiments of this invention are retroreflective substrates. Retroreflective materials have the property of redirecting light incident on the material back toward its originating source. In situations where the retroreflective sheeting may need to flex or conform to a surface, a sheeting may be selected, to permit flexing without sacrificing retroreflective performance.

There are two common types of retroreflective sheeting: microsphere-based sheeting and cube-corner sheeting. Microsphere-based sheeting, sometimes referred to as "beaded" sheeting, is known and employs a multitude of microspheres, typically at least partially embedded in a binder layer and having associated specular or diffuse reflecting materials (e.g., pigment particles, metal flakes or vapor coats, etc.) to retroreflect incident light. Illustrative examples of such retroreflectors are disclosed in U.S. Pat. No. 3,190,178 (McKenzie), U.S. Pat. No. 4,025,159 (McGrath), and U.S. Pat. No. 5,066,098 (Kult). Microsphere based sheeting does not have a regular predetermined channel pattern.

Basic cube-corner retroreflective sheeting is known and may be used as a differentiating component 420 in the articles of the invention. Such sheeting is frequently used on road signs, safety garments and the like. The sheeting comprises a substantially planar base surface and a structured surface comprising a plurality of cube-corner elements opposite the base surface. Each cube-corner element comprises three mutually substantially perpendicular optical faces that intersect at a single reference point, or apex. Light incident on the planar base surface of the sheeting is refracted at the base surface of the sheeting, transmitted through the sheeting, reflected from each of the of the three perpendicular cube-corner optical faces, and redirected toward the light source. The symmetry axis, also called the optical axis, extends through the cube-corner apex and forms an equal angle with the three optical surfaces of the cube-corner element. Cube-corner elements typically exhibit the highest optical efficiency in response to light incident on the base of the element roughly along the optical axis. The amount of light retroreflected by a cube corner retroreflective surface drops as the incidence angle deviates significantly from the optical axis.

Manufacturers of retroreflective sheeting are known to design retroreflective sheeting to exhibit its peak performance in response to light incident on the sheeting at a specific angle of incidence. The term "entrance angle" is used to denote the angle of incidence, measured from an axis normal to the base surface of the sheeting, of light incident on the sheeting. See, e.g. ASTM Designation: E 808-93b, Standard Practice for Describing Retroreflection. Retroreflective sheeting for signing applications is typically designed to exhibit its optimal optical efficiency at relatively low entrance angles (e.g. approximately normal to the base surface of the sheeting). See, e.g. U.S. Pat. No. 4,588,258 to Hoopman.

Other applications such as, for example, pavement marking or barrier marking applications, require retroreflective sheeting designed to exhibit its maximum optical efficiency at relatively high entrance angles. For example, U.S. Pat. No. 4,349,598 to White ('598 patent), discloses a retroreflective sheeting design wherein the cube-corner elements comprise two mutually perpendicular rectangular faces disposed at 45 degrees to the cube-corner sheeting base and two parallel triangular faces perpendicular to the rectangular faces to form two optically opposing cube-corner elements. U.S. Pat. No. 4,895,428 to Nelson et al. ('428 patent) and U.S. Pat. No. 4,938,563 to Nelson et al. ('563 patent) disclose a retroreflective sheeting wherein the cube-corner elements comprise two nearly perpendicular tetragonal faces and a triangular face nearly perpendicular to the tetragonal faces to form a cube-corner. The cube-corner elements further include a non perpendicular triangular face, all of the aforementioned cube-corner sheeting would be expected to be useful in the articles of the present invention. The manufacture of retroreflective cube-corner element arrays is typically accomplished using molds made by different techniques, including those techniques known as pin bundling and direct machining. Molds manufactured using pin bundling are made by assembling together individual pins that each have an end portion shaped with features of a cube-corner retroreflective element. U.S. Pat. No. 3,632,695 (Howell) and U.S. Pat. No. 3,926,402 (Heenan et al.) disclose illustrative examples of pin bundling. The direct machining technique, also known generally as ruling, comprises cutting away portions of a substrate to create a pattern of grooves that intersect to form structures including cube-corner elements. The grooved substrate is typically used as a master mold from which a series of impressions, i.e., replicas, may be formed. In some instances, the master itself may be useful as a retroreflective article. More commonly, however retroreflective sheeting or retroreflective articles are formed in a polymeric substrate using the master mold or using replicas of the master mold.

Direct machining techniques are a useful method for manufacturing master molds for small microcube arrays. Small microcube arrays are particularly beneficial for producing thin retroreflective sheeting having good flexibility. Microcube arrays are also more conducive to continuous manufacturing processes. The process of manufacturing large arrays of cube-corners is also relatively easy using direct machining methods rather than pin bundling or other techniques. An illustrative example of direct machining is disclosed in U.S. Pat. No. 4,588,258 (Hoopman).

Master molds suitable for use in forming cube-corner sheeting in accordance with the '598 patent, the '428 patent, and the '563 patent may be formed using direct machining techniques as described above. However, the cube-corner geometries disclosed in these patents require two different machining tools to produce a master mold. This reduces the efficiency of the master mold manufacturing process. Additionally, master molds manufactured according to these patents comprise surfaces that extend substantially perpendicular to the base surface of the master mold. Such perpendicular surfaces can be detrimental to the process of producing exact replicas of the master mold.

It is believed that all cube-corner sheeting discussed in the aforementioned patents would be useful in the articles of the present invention. Other microstructured retroreflective substrates which have projections other than cube-corners would also be useful in the articles of the invention. The substrates useful according to the invention may optionally have one or more of the following optical characteristics: retroreflectivity, total internal reflection, and partial internal reflection. These include refractive and/or diffractive properties, for example. The microstructured substrate itself can have specular or diffusive properties to improve the visibility of the fluid on the microstructured substrate. As the fluid wets the microstructured surface, the difference between the refractive index of the microstructured surface and the fluid decreases, resulting in frustration of the optical characteristics of the microstructured substrate and improving its transparency.

As previously mentioned, the indicator 414 of the shock indicator 410 may comprise a suspension of exfoliated organophilic clay or other solid filler material with a fluid. Regarding the solid filler material useful in the formulation of the indicator 414, suitable solids can be selected and obtained from commercial resources providing the exfoliated clay such as Nanocor of Arlington Heights, Ill. or Southern Clay Products, Inc. of Gonzalez, Tex. Other useful solid filler materials may comprise silica particles including hydrophobic silica particles, fumed silica particles; bubble and microbubble glass particles; hollow and solid glass spheres; inorganic pigments including titanates and zirconates. Also included would be solid filler materials whose surfaces are chemically and/or physically modified to improve their compatibility with the fluid phase of the suspension.

Regarding the fluids available for use in the formulation of the indicator 414, suitable fluids can comprise a variety of materials. These material typically have certain properties that may be beneficial in their use as an indicator material. For example, the surface tension of the fluid can vary such that the surface tension of the fluid at 23° C. may range from about $10\times10^{-3}$ N/m to about $80\times10^{-3}$ N/m, typically from about $10\times10^{-3}$ N/m to about $60\times10^{-3}$ N/m, and often from about $10\times10^{-3}$ N/m to about $50\times10^{-3}$ N/m. Most commonly, the surface tension of the fluid may range from about $10\times10^{-3}$ N/m to about $40\times10^{-3}$ N/m. The density of the fluid can vary. Typically the density of the fluid at 23° C. ranges from about 0.5 to about 2 grams/cm$^3$, commonly from about 0.5 to about 1.5 grams/cm$^3$, and often from about 0.8 to about 1.5 grams/cm$^3$. Likewise, the zero rate shear viscosity of the fluid can vary at 23° C. from about $1\times10^{-3}$ to about $1\times10^6$ Pa-s, typically from about 0.1 to about $1\times10^5$ Pa-s, and often from about 1 to about 10,000 Pa-s.

The fluid selected for use in the indicator 414 is typically an innocuous and relatively non-reactive liquid to minimize or even eliminate undesired reactions or other potentially damaging and/or non-useful interactions with the other components of the article. Examples of useful relatively innocuous and non reactive fluids include, but are not limited to, the following: silicone fluids such as polydimethylsiloxane fluids, saturated hydrocarbon-based oils, silicone oils and gums, mineral oils, glycerols, water, and aqueous based fluids.

The fluid may or may not be colored. In an embodiment, such as that shown in FIG. 9, where the differentiating component 420 is retroreflective, or where the substrate may have the optical characteristics as discussed herein, the fluid is typically clear and colorless. As the fluid fills the channels, it causes the total internal reflection to become frustrated. In other words, the substrate that appeared opaque now appears clear in those areas where the channels are filled, allowing a viewer (represented by "A") to observe the colored cover layer below. The fluid typically has an index of refraction within about 0.4 of the index of refraction of the microstructured substrate surface and more typically substantially the same index of refraction. However, the exact nature of the fluid can vary as long as, when it is used in an application where it is intended to render the substrate transparent, it does so sufficiently so one can identify the fluid flow front by, for example, viewing any color and/or graphics beneath the substrate.

When the substrate is not retroreflective or when the substrate is retroreflective but one does not intend to use it in a manner that causes it to become transparent, the fluid typically contains pigment(s) and/or dye(s) (such as blue organic dye, for example) and the substrate is selected to provide a contrast to the fluid flow (such as a white opaque substrate, for example).

The selection of the fluid and the differentiating component and the positioning thereof in the shock indicator articles of the invention is accomplished to allow an observer to view the progress of the fluid over time as it migrates through the aforementioned channels 421. Depending on the particular embodiment of the article of the invention an observer may find that the fluid is more readily visible by changing the viewing angle. An observer can readily manipulate the article or change his/her viewing position to find a preferred viewing angle.

Suitable fluids according to the present invention include, for example, viscoelastic and viscous fluids and combinations thereof that provide the desired properties for migration into the channels of the microstructured surface in response to a shock event of a given magnitude. For capillary action to primarily drive the migration of the fluid into the channels of the microstructured substrate, the surface energies of the article components should preferably cause the local contact angle of the fluid on the microstructured surface of the substrate to be less than about 90 degrees, more preferably less than about 25 degrees, within the range of intended use temperatures. The contact angle is a function of the surface energy of the microstructured surface, the surface energy of the fluid (e.g. liquid), and the interfacial energy between the two.

A viscous material can be defined by analogy to classic viscous fluids. If an external stress is applied to a viscous fluid, it will deform and continue to deform as long as the stress is present. Removal of the stress will not result in a return of the fluid to its undeformed state. Such a response is called viscous flow and defines a viscous material or fluid. When there is a direct proportionality between the stress and the rate of deformation in a viscous fluid, the fluid is a Newtonian fluid. There are also viscous fluids that are non-Newtonian and which exhibit a non-linear dependence between the stress and the rate of deformation. In the articles of the invention, stress results from a shock event of a given magnitude.

Materials that exhibit both elastic and viscous properties simultaneously are called viscoelastic materials. Elastic properties can be explained with reference to classic elastic solids. Elastic solids respond to external stress by deforming and, upon removal of the stress, respond by returning to their original shape. Such a response is called elastic. Some elastic materials exhibit a direct proportionality between the stress and the deformation, thereby conforming to what is known as Hooke's Law. There are also elastic materials that do not obey Hooke's Law and that exhibit a non-linear relationship between stress and deformation. Viscoelastic materials are sometimes classified as either viscoelastic solids, i.e., elastic solids that exhibit some viscous effects during deformation, or viscoelastic liquids, i.e., viscous liquids that exhibit some elastic effects. A viscoelastic liquid can be identified as a viscoelastic material that continues to deform indefinitely when subjected to a stress.

A viscoelastic material may exhibit a transition from an immobile, glassy state to a viscoelastic liquid state at a temperature known as the glass transition temperature, $T_g$. It may also exhibit a transition from a partially crystalline state to an amorphous state at the temperature at which the crystalline material melts, $T_m$. Often, such a material will behave as a viscoelastic solid below $T_m$. The properties and the analysis of viscoelastic materials are discussed in John D. Ferry, *Viscoelastic Properties of Polymers*, (John Wiley & Sons, Inc. 1980). Fluids selected for use in the articles of the invention normally have $T_g$ and $T_m$ below the temperatures at which the article of the invention is intended for use.

In an article of the present invention, when a viscoelastic material has been selected for use, it is preferred to use a viscoelastic liquid exhibiting small elastic effects, such that it behaves essentially as a viscous fluid in a liquid state at all anticipated temperatures to which the article of the invention will be exposed. An illustrative, non-limiting, list of viscoelastic and viscous materials that may be suitable for use as an indicator material in the articles of the present invention includes natural rubber; butyl rubber; polybutadiene and its copolymers with acrylonitrile and styrene; poly(alpha-olefins) such as polyhexene, polyoctene, and copolymers of these and others; polyacrylates; polychloroprene; polydimethylsiloxane; silicone oils and gums; mineral oils; and block copolymers such as styrene-isoprene block copolymers; and mixtures of any of the above.

The viscoelastic materials may, for example, comprise elastomers conventionally formulated as pressure sensitive adhesives. Examples thereof include, but are not limited to, polyisoprene, atactic polypropylene, polybutadiene, polyisobutylene, silicone, ethylene vinyl acetate, and acrylate based elastomers and can typically include a tackifying agent and/or a plasticizing agent.

Monomers useful in making fluids useful in the articles of the invention include, but are not limited to, those that have a homopolymer glass transition temperature less than about 0° C. Useful alkyl acrylates include, but are not limited to, unsaturated monofunctional (meth)acrylic acid esters of non-tertiary alkyl alcohols having from 2 to 20 carbon atoms in the alkyl moiety, typically from 4 to 18 carbon atoms, and often from 4 to 12 carbon atoms. Examples of useful alkyl acrylate monomers include, but are not limited to, n-butyl acrylate, hexyl acrylate, octyl acrylate, isooctyl acrylate, 2-ethylhexyl acrylate, isononyl acrylate, decyl acrylate, dodecyl acrylate, lauryl acrylate, octadecyl acrylate, and mixtures thereof.

An example of an optional reinforcing co-monomer is a monoethylenically unsaturated monomer having a homopolymer glass transition temperature greater than about 25° C. and is preferably co-polymerized with the acrylate monomers. Examples of useful co-polymerizable monomers include, but are not limited to, meth(acrylic) acid, N-vinyl pyrrolidone, N-vinyl caprolactam, substituted (meth)acrylamides such as N,N-dimethyl acrylamides, acrylonitrile, isobornyl acrylate, and mixtures thereof. When a copolymerizable monomer is used, the alkyl acrylate is typically present in the composition in amounts from about 50 to 99 parts by weight and the co-polymerizable monomer is typically present in corresponding amounts from 50 parts to 1 part by weight, wherein the total amount by weight is 100.

The elastomer can optionally include a tackifier and/or plasticizer in a tackifier to elastomer base weight ratio or a plasticizer to elastomer base weight ratio of typically up to about 2:1. Suitable tackifiers include, but are not limited to, hydrogenated rosin esters commercially available under the trade designations "Foral 85", "Foral 105", or "Abitol E" and hydrocarbon tackifiers such as those known as "Regalrez", all available from Eastman Chemical Company of Kingsport, Tenn. Suitable plasticizers include, but are not limited to, hydrocarbon oils such as those available under the trade designation "Shellflex" (available from Shell Chemical Co., Houston, Tex., USP grade mineral oil, and phthalates including alkyl phthalates such as dioctyl phthalate, diisononyl phthalate, and allyl phthalates.

The article of the invention is preferably designed to provide sufficient fluid to fill the channels of the microstructured surface as the fluid migrates along the channels. The components of the article are normally chosen to provide a desired rate of migration of the fluid into the channel structure of the microstructured substrate. In a shock indicator, the fluid such as a viscous liquid, for example, will migrate through the aforementioned channel structure at a rate that is roughly proportional to the magnitude of the shock event. By controlling the properties of the liquid, the indicating device can be constructed to provide a visually observable indication that the article has experienced a shock event exceeding a given magnitude. Accordingly, it is desirable to be able to select a liquid having suitable characteristics for the contemplated magnitude of the shock event. Preferably, the viscous fluid also exhibits a yield stress such that the stress created by the shock event exceeds this yield stress allowing the fluid to flow into the channel structure. Such a viscous fluid would also stop flowing when this stress is removed (i.e. when the shock event is over). The viscous fluid with a yield stress effectively provides and on/off behavior that is desirable in this embodiment. One way of generating a viscous fluid exhibiting a yield stress is to use the solid filler materials described above along with the appropriate viscous liquid to create a suspension—i.e., a viscous fluid exhibiting a yield stress or a suspension of exfoliated organophilic clay or other solid filler material with a fluid such as mineral oil. Other suitable solid filler materials may comprise silica particles including hydrophobic silica particles, fumed silica particles; bubble and microbubble glass particles; hollow and solid glass spheres; inorganic pigments including titanates and zirconates. Also included would be solid filler materials whose surfaces are chemically and/or physically modified to improve their compatibility with the fluid phase of the suspension.

The textured or microstructured surface 420a may be adhered to the base member 412 using a suitable adhesive which may also comprise a pigment or other coloring agent. In one such application, a pressure sensitive adhesive filled with carbon black may be applied to the textured surface 420a to partially cover the texture-imparting structure thereof. Lamination of the textured surface 420a to the base member 412 creates a series of interconnected microchannels 421 between the laminated layers and surrounding but not initially in contact with the indicator 414. The channels 421 are initially filled with air when the device 410 is in a first configuration (e.g., see FIG. 8), and the properties of the differentiating component 420 are such that the resulting laminated structure will not reveal the adhesive color under the material 420. As an alternative to using a colored adhesive layer, the base member 412 can be supplied as a colored material. In such a construction the adhesive or other laminating material should be transparent.

When the device 410 is in a second configuration (e.g., FIG. 9) following the occurrence of a shock event, liquid from the indicator 414 is released into the annular space 430 of the differentiating component 420 where the liquid is then drawn into the microchannels 421 that are provided between the base member 412 and the surface 420a. The liquid is pulled into the microchannels 421 by capillary action, and the presence of the liquid within the microchannels 421 causes a change in the optical properties of the material 420 to thereby provide a color change that can be readily seen by an observer. Such a color change may be taken an indication that a shock event has occurred.

It will be appreciated that the containment member 418 and the optical indicator material 420 can be integrated by manufacturing a single film serving both functions. Those skilled in the art will appreciate that a suitable manufacturing process to produce an integrated top film could comprise thermo- or vacuum forming with embossing to produce the protective dome structure and the diamond grade microstructure in a single pass for a continuous process. Such a construction is contemplated within the scope of the invention.

Figure 10:
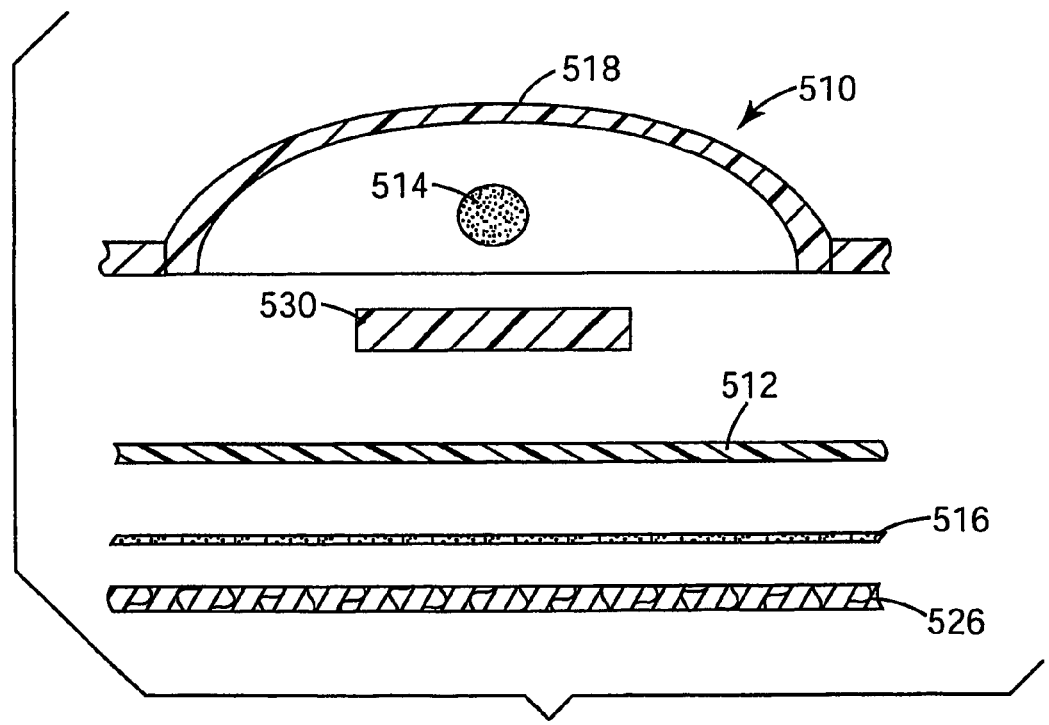
FIG. 10 is a cross sectional side elevation view still another embodiment of a shock indicator according to the present invention.

Still another embodiment of a shock indicator device 510 according to the invention is illustrated in FIG. 10. In the depicted device 510, a transmission layer 530 is provided to reduce, maintain or increase the force transmitted from or by the shock event. The transmission layer 530 is provided and positioned on the base layer 512. The transmission layer 530 can be designed to have a damping and/or isolation effect by using materials that provide adherence of the indicator 514 as well as additionally providing damping and/or isolation properties. In the depicted embodiment, the base member 512, containment member 518, release liner 526, and adhesive 516 are as previously described. The layer 530 may be included in a shock indicator device of the invention to alter the threshold vibrational frequency and/or the magnitude of force at which the device 510 will transition from a first condition to a second condition to indicate that a shock event has occurred. Suitable materials for the transmission layer 530 include those that will provide a desired degree of damping and/or isolation. The selection of materials for the transmission layer and/or the attachment means will also change the natural frequency of the indicator 514. The selection of materials for the transmission layer and/or the attachment means will combine to effect the level of force that the indicator experiences. In such a construction, the transmission layer 530 will change the level of shock force that the indicator 514 experiences upon the occurrence of a shock event.

The shock indicator 514 can be made from materials with high or low damping potential, which will affect the amplification factor. Exemplary materials for the transmission layer 530 include those described in U.S. Pat. No. 6,456,455, the disclosure of which is incorporated in its entirety herein by reference thereto. In general the vibration damping material of the transmission layer 530 will comprise a viscoelastic material or combination of different viscoelastic materials. Suitable viscoelastic materials include those having a storage modulus of at least about 1.0 psi ($6.9 \times 10^3$ Pascals) and a loss factor of at least about 0.01 at the temperature and frequency of use (typically about −60 to 100° C.). Those skilled in the art will appreciate that a viscoelastic material is viscous and capable of dissipating energy, yet exhibits certain elastic properties that make it capable of storing energy in a manner similar to a spring and thus can also have isolation or amplification characteristics based on the material's Tg, geometry, application, and the like.

Those skilled in the art will also appreciate that the transmission layer 540 may comprise materials selected to have a certain viscoelastic ratio, depending on the ultimate use of the finished shock indicator. For example, a high Tg epoxy at room temperature will have a high modulus or elastic portion and a very low viscous portion (loss factor less than about 0.15). Or the layer could be a material with a higher loss factor at room temperature with a lower modulus. Viscoelastic materials for use in the vibration damping materials normally will have a loss factor, i.e., the ratio of energy loss to energy stored, of at least about 0.01, often at least 0.15. The loss factor is a measure of the material's ability to dissipate energy and depends on the frequency and temperature experienced by the damping material. More typically, the loss factor for the vibration damping materials is at least about 0.3, normally at least about 0.5, and may reach about 0.7-10 in the frequency and temperature range where damping is required (generally in the range of about 1-10,000 Hz and from −60 to about 100° C., typically in the range of about 50-5,000 Hz and about 0-100° C., and more often in the range of about 50-1500 Hz and about 20-80° C.). As an example of a specific type of material, a crosslinked acrylic polymer at a frequency of 100 Hz, the loss factor at 68° F. (20° C.) is typically about 1.0, while at 158° F. (70° C.), the loss factor is about 0.7.

It should be appreciated that the present invention utilizes principles known in the art including, without limitation, the relationship between force, mass and acceleration—i.e., Force=(mass)(acceleration). Properties such as, for example, the mass of the indicator or the subparts thereof, the frequency of the shock event, acceleration, damping, the loss factor, the storage modulus, the loss modulus, isolation, the spring constant, stiffness, the natural frequency, the resonant frequency, the geometry, the configuration of the indicator, and the point of placement on a surface for an end use of the shock indicator can all effect or can influence the design of the shock indicator of the invention. Additionally, environmental conditions (e.g., temperature and humidity) can influence the selection of materials that impact the performance of the shock indicator across the range of end-use environments. In selecting an approach to the design of a particular shock indicator device, it may be appropriate to consider these various concepts and/or properties and how they may impact the performance of the device.

Useful viscoelastic damping materials can be isotropic as well as anisotropic, particularly with respect to elastic properties. As used herein, an "anisotropic material" or "nonisotropic material" is one in which the properties are dependent upon the direction of measurement. Specific viscoelastic materials useful herein include urethane rubbers, silicone rubbers, nitrile rubbers, butyl rubbers, acrylic rubbers, natural rubbers, fluorine-based elastomers and rubbers, styrene-butadiene rubbers, synthetic rubbers, and the like. Other useful damping materials include acrylates, epoxy-acrylates, silicones, acrylate-silicone mixtures, cyanate esters, polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Specific examples of useful materials are also described in or referenced in U.S. Pat. Nos. 5,183,863; 5,262,232; and 5,308,887. Examples of thermoplastic materials suitable for use as the vibration damping material include, but are not limited to, those selected from the group consisting of polyacrylates, polycarbonates, polyetherimides, polyesters, polysulfones, polystyrenes, acrylonitrile-butadiene-styrene block copolymers, polypropylenes, acetal polymers, polyamides, polyvinyl chlorides, polyethylenes, polyurethanes, and combinations thereof. Useful viscoelastic materials can also be crosslinkable to enhance their strength and/or temperature resistance. Such viscoelastics are classified as thermosetting resins. During the manufacturing process, the thermosetting resin is cured and/or crosslinked typically to a solid state, although it could be a gel upon curing, as long as the cured material possesses the viscoelastic properties described above. Depending upon the particular thermosetting resin employed, the thermosetting resin can include a curing agent, e.g., catalyst, which, when exposed to an appropriate energy source (such as thermal energy), the curing agent initiates polymerization of the thermosetting resin.

It will be appreciated that the properties of the transmission layer can be changed by the curing process used for the particular polymer system employed. This could enable a shock indicator to have one set of performance criteria during manufacturing and shipping and an alternate set of performance criteria when attached to an end use application. The system could be designed to have high damping and isolation during manufacturing and shipping to safeguard the shock indicator from premature activation and once applied to the end use application, the polymer system may be further, or more fully, cured so that the damping and isolation properties are changed and the indicator will thereafter activate upon the occurrence of shock event of a predetermined threshold level. Examples of polymer systems for use as transmission layers according to the foregoing criteria include pressure sensitive adhesive layers with at least one epoxy mixture or resin in the layer. In this combination, the PSA provides damping and isolation during assembly and shipment. Once the shock indicator is applied to an end use application, the epoxy system in the transmission layer can be exposed to a curing method for the epoxy and the Tg is changed to thereby change the damping and isolation performance of the shock indicator.

It will be further appreciated that the transmission layer and the external attachment means can both be selected and designed to provide the same, similar or different damping and isolation characteristics. The shock indicator enclosure construction plus it's attachment means and the agglomeration construction and its attachment means inside the enclosure can affect the amplification of the vibration or shock force to the agglomeration in the shock indicator. Likewise, the shock indicator of the invention may be constructed to take advantage of many or only a few different material properties inherent in the materials selected for each of the individual components to thereby change the amplification factor that the indicator experiences and the threshold value for the shock event that will cause the shock indicator to transition from a first condition to a second condition. Additionally, the geometry of the components, environmental conditions (temperature, etc.) and the like can all contribute to the threshold at which a shock event will trigger the shock indicator to indicate the occurrence of the shock event, as described herein. Thus, it will be understood that the materials and components used in the construction of the shock indicator device of the present invention can all be used to change the isolation-damping-amplification-transmissibility properties of the shock indicator device, thus changing how the indicator responds to a particular shock event.

The vibration damping material used in the transmission layer can optionally include additives such as fillers (e.g., talc, etc.), colorants, toughening agents, fire retardants, antioxidants, antistatic agents, and the like. The vibration damping material can optionally contain fibers and/or particulates additives that are designed to provide an increased thermal and/or electrical conductive path through the vibration damping material.

It will be appreciated that the manufacture of the foregoing embodiment can be accomplished according to the above described manufacturing method by incorporating another line for the lamination or attachment of the transmission layer to the base layer or to the differentiating component described herein. As mentioned, the materials used for the transmission layer may be provided as a pressure sensitive adhesive or other form of adhesive material that provides the means for attaching the transmission layer to the base or the differentiating layer. Other materials may require additional means for affixing these components to one another such as the application of additional adhesive layer(s), calendaring with heat and pressure, and the like. Such methods are well within the skill of those practicing in the field and are not further described herein.

Regarding applications, the shock indicator of the present invention may be applied to any of a variety of devices where it may be appropriate or desired to monitor in a passive mode any and all shock events experienced by the device. In particular, cellular telephones and other hand-held electronic devices are particularly suited to be equipped with the shock indicator of the invention. One particular application involves the placement of the indicator of the invention in a cellular telephone. Current warranty practices within the cellular industry preclude warranty coverage where the user has abused the device. Hence, the shock indicator of the invention may be used in conjunction with cellular telephones as a means to determine whether the telephones have experienced a shock event caused, for example, by dropping the telephone from a significant height onto a hard surface such as concrete or the like. Similar applications also exist for other hand-held devices as well as any variety of electronic components and equipment. In view of the foregoing applications, it will be appreciated that the size of the shock indicator may be an important feature. Use of the shock indicator inside of a hand-held device will typically require that the indicator be relatively small.

When placed in association with a device, consideration should also be given to the hardness of the surface to which the shock indicator is being affixed because the placement of the shock indicator in an end use application will also affect the shock indicator's apparent performance. If the shock indicator is placed onto a very rigid portion of a rigid structure, the shock indicator will perform differently than if the indicator is attached to another portion of the structure that is isolated from the stiff structure that is encountering the shock or vibration event.

In still another embodiment of the invention, multiple levels of activation may be indicated within a single shock indicator. As mentioned herein, the cohesive character of the agglomerated indicator can be modified by the presence of a small amount of an oil or other organic diluent or agglomeration aid. Mineral oil, for example, may be used as an agglomeration aid in agglomerating the powder indicators of the invention. Levels of the agglomeration aid in the agglomerated powder are typically very low, and as little as about 2 wt. % mineral oil has been used. As the mineral oil concentration in increased, the threshold level of force also increases (e.g., the minimum amount of force required to transition the indicator from the first state to the second state). The maximum level of mineral oil in the particle agglomeration is limited by the volume ratio of the oil and the solid particulate at which the particles become a discontinuous phase while the liquid becomes a continuous phase. In providing multiple levels of shock indication in a single indicator, it has been found that varying the concentration of the agglomeration aid can change the threshold level at which the indicator transitions from a first configuration to a second configuration following a vibrational shock so that the shock indicator can be observed in a second or activated state.

In the contemplated embodiment, two, three or more colored indicator compositions of an agglomerated powder can be used to indicate different levels of vibrational or inertial shock. In this embodiment each of the agglomerated powder indicators is typically formulated to comprise the same powder materials with each of the indicators having different levels of mineral oil therein. In the manufacture of such an embodiment, a dispersion of the powder and mineral oil may be placed in discrete independent dots around a central area on a base member and thereafter covered with a containment member such as a protective dome. An organic (e.g., hydrocarbon) diluent may be added to the mixture of powder and oil to allow for the preparation of a slurry with binder and powder. The diluent is typically selected to be volatile so that it will evaporate after the slurry is deposited on the base member, thereafter leaving the agglomerated powder indicator. The base member may be treated in a manner that enhances the color or visual differences between the powder and the materials of the base member. For example, polyester film may be treated with a black aluminum oxide evaporation process, such as that described in U.S. Pat. Nos. 4,430,366 and 5,766,827, to produce a black film that will serve as a base member with sufficient color contrast to permit a quick visual confirmation of the state of each of the agglomerated indicator powders. In such a construction, a device associated with the shock indicator may then be subjected to vibrational shocks of different magnitudes. The agglomerated indicator comprising the lowest amount of mineral oil will be the first to transition to a second configuration. On subsequent increasing shock treatments the other agglomerated indicators will also disperse at progressively greater vibrational shock levels.

In addition to the inclusion of multiple indicators within the same shock indicator, it is within the scope of the invention to include more than one shock indicator, such as the shock indicator embodiments shown in the various Figures herein, in association with a single device. Each of the different shock indicators may be constructed to transition from the agglomerated or first state to a dispersed or second state upon the occurrence of shock events of different magnitudes.

In still another embodiment of the invention, a wetness indicator may be combined with the shock indicator of the invention to provide a combined device capable of passively showing exposure of the shock indicator to vibrational or inertial shocks as well as showing whether an associated device has been exposed to water or other forms of moisture. A suitable wetness indicator that can be incorporated into the shock indicator of the invention include conventional wetness indication paper comprising a white paper base, an indicator dye and pressure sensitive adhesive. Where the powdered agglomerated indicators do not contain water, the indicator can be applied to a white paper base in the same way as it would otherwise be applied to the above described polymeric film. A suitable wetness indicator that may be combined with the shock indicator of the present invention includes that described in co-pending U.S. patent application Ser. No. 09/972,124, filed Oct. 1, 2001, entitled "Water Contact Indicator," the disclosure of which is incorporated in its entirety herein by reference thereto.

In still another embodiment, the protective film structure of the containment member may comprise dimples, intrusions, protrusions, multiple layers and/or different material layers that change the optical characteristics of the protective film. The inclusion of these features can also be, at least in part, for the purpose of changing the strength of the protective film structure.

In still another embodiment, the indicator can comprise primary and secondary matrices wherein the first matrix is an agglomeration of powder particles and the second matrix is comprises larger glass bubbles or beads (or other similar objects). The larger components of the secondary matrix provides a structure for the smaller primary agglomerated powders to further attach and also can provide a structure with greater X-Y-Z dimensions and stability with a larger primary agglomeration overall versus a agglomeration with no secondary matrix. This construction can also be designed so that the larger matrix will "break free" from the attachment location within the enclosure while the smaller powder particles become fractured from the secondary matrix. In a variation of the foregoing embodiment, the smaller powder particles break free of the larger secondary matrix upon experiencing a first level of shock while the larger matrix can be positioned within the indicator device to break free at its attachment points upon the occurrence of a second (e.g., higher) level of shock. The secondary matrix can comprise one or more larger particles of any of a variety of geometries and sizes including larger those mentioned herein such as beads, (e.g., glass, plastic or ceramic) as well as metal beads (e.g., ball bearings).

In still another embodiment, the containment member of the shock indicator is attached to a desired location with an attachment means such as an adhesive provided in a discontinuous coating or one that utilizes a smaller or larger area than actual base of the shock indicator. In this construction, attachment can occur with one, two, three or more individual attachment points between the base of the shock indicator and the surface of the desired object.

In still another embodiment, the shock indicator contains the above described indicator comprising agglomerated particles of powder or the like. Additionally, one or more objects may can be attached (loose or firmly) or be free to move about the enclosure, so that the objects impact the agglomerated powder during a shock event to aid in the fracture of the powder agglomeration and the indication of a desired shock event. The impingement objects could be glass beads, bubbles, BB's and the like, and the masses, sizes and shapes of the objects can be changed to achieve a desired movement within the containment member of the shock indicator. If the containment member is provided with dimples or other surface structures, these structures can help to direct the objects in striking the agglomerated powder when a shock event occurs. Moreover, the additional objects can be designed or selected to provide a significant force when accelerated within the confines of the containment member during a shock event.

In another embodiment of the invention, the indicator can include primary and secondary subparts wherein the primary subparts are larger objects and the secondary subparts are smaller objects such as the powder particulates described herein. The secondary subparts agglomerate around one or more primary subparts to form a single mass useful as an indicator. The primary subpart(s) may be attached to the base with the secondary subparts agglomerated therearound. A shock event causes the primary subparts to dislodge from the base and the associated movement of the mass breaks apart the associated secondary subparts, providing shock indication. The primary subparts could comprise one or more masses with an associated agglomeration of the secondary subparts agglomerated around the primary subpart(s). Each primary subpart(s) could be the same or different as other primary subparts.

In another embodiment of the invention, the indicator can be positioned within the containment member so that a shock event from any direction will impart substantially the same shearing, compression, tension, cleavage and/or peel forces into the indicator. A means for positioning the indicator within the device might be to have more than one attachment point for positioning the indicator within the device. Attachment points may be provided to facilitate the attachment of the indicator to the base member and/or to the other components of the device such as an attachment point to the internal surface of the containment member, for example. Such a means for attaching the indicator might be considered a multi-axis attachment.

In another embodiment of the invention, single or multiple masses may be added to the shock indicator enclosure interior and/or exterior surfaces to further modify the response of the shock indicator to a shock event. The modified response of the shock indicator may be determined by the amount and/or number of additional mass added to the device as well as the position of the masses within the containment member of the shock indicator device.

In another embodiment of the invention, the indicator comprises a viscous liquid with one or more shear plane surfaces within the liquid. The liquid is as described elsewhere herein along with one or more masses or added shear plane geometries (glass beads, bubbles, BB's, pins, posts, etc.) that can be of various sizes and shapes that aid in the shear thinning of the liquid in response to a shock event. The masses increase the shear force into the fluid and provides additional shear thinning planes or surfaces.

In still another embodiment of the invention, the indicator can comprise a combination of colored materials that will facilitate the visual determination of whether the indicator has transitioned form the first state to the second state following a shock event. For example, the indicator may comprise a first agglomerated powder present at a low concentration in a first color and the second agglomerated powder present at a high concentration in a second color. In a first state prior to a shock event, the colors of the two agglomerated powders appear distinct and both colors are visually observable to an observer. In a second state following a shock event, the two agglomerated powders become dispersed and, in the dispersed state, will appear as a single color, typically as the second color due to the lower concentration of the first powder and the mixing of the powder particles that occurs when the particles are dispersed.

While various embodiments of the invention have been described in detail, it should be appreciated that the invention is not limited to the specific constructions that have been described. Changes to the basic construction are possible such as by adding additional film layers to the base member that serve one or more additional functions in the operation of the finished shock indicator device. For example, a tamper-indicating shock indicator device may comprise layers of (a) a planar, light-transmissive layer; (b) a light-transmissive imaged release coating; and (c) an adhesive layer; in which (i) the image is not visible until becoming permanently visible when the release coating is separated from the other layer(s); and (ii) the assembly cohesive strength of the indicator device ensures that the device remains as a single unit after the release coating is separated and the image is seen. Such layers are described in U.S. Pat. No. 5,770,283 to Gosselin et al. Additionally, the exact ordering of the components and the order of the manufacturing steps in the above described method may be changed without changing the basic construction of the invention—i.e., a base and an indicator that is capable of being presented in one configuration prior to the experience of a shock event and which presents itself in a second configuration in response to a shock event to indicate to an observer that the device has experienced such a shock event. The indicator device of the invention can be constructed to increase or to decrease the sensitivity of the device to customize the device to transition for the first configuration to a second configuration only when the predetermined threshold shock has been experienced by the device. In this manner, the invention provides a shock indicator that can be customized for a particular application where shock indication is appropriate only for shock events exceeding a threshold value at which components or the like of the associated electronic or other device are more likely to experience damage or harm from such a shock event. Additional unforeseen changes and modifications to the described embodiments may also be possible which also may be equivalents to the components described herein. All such modifications are contemplated as being within the scope of the invention, as generally set forth in the following claims.

What is claimed is:

1. A method for the manufacture of a shock indicator, comprising:
    (A) providing a base comprising a first surface and a second surface, the second surface of the base associated with an attachment means; and
    (B) placing an indicator in association with the first surface of the base, the indicator comprising an agglomerated powder comprising powder particles arranged (i) in a first configuration when the shock indicator is in a first state prior to a shock event, and (ii) in a second configuration when the shock indicator is in a second state following a shock event, wherein placing an indicator in association with the first surface of the base comprises depositing a slurry in association with the first surface and thereafter drying the slurry.

2. The method of claim 1 further comprising placing a containment member over the first side of the base and over the indicator, the containment member being transparent, thereby facilitating the visual determination of whether the indicator is in the first configuration or the second configuration.

3. The method of claim 1, further comprising providing a means for attaching the indicator to another surface.

4. The method of claim 1 wherein placing an indicator in association with the first surface of the base further comprises placing a plurality of indicators in association with the first side of the base, each indicator comprising a plurality of powder particles arranged (i) in a first configuration prior to a shock event, and (ii) in a second configuration following a shock event.

5. The method of claim 1 further comprising associating an electronic device with the shock indicator, the device selected from the group consisting of cellular telephone, personal digital assistant, hand held computer and digital camera.

* * * * *

UNITED STATES PATENT AND TRADEMARK OFFICE
CERTIFICATE OF CORRECTION

PATENT NO. : 7,219,619 B2  Page 1 of 1
APPLICATION NO. : 10/517685
DATED : May 22, 2007
INVENTOR(S) : Robert C. Fitzer It is certified that error appears in the above-identified patent and that said Letters Patent is hereby corrected as shown below:

Column 9
Line 44, delete the word "win" and insert in place thereof -- will --.

Column 12
Line 37, delete the word "film" and insert in place thereof -- films --.

Signed and Sealed this

Seventh Day of August, 2007

JON W. DUDAS
*Director of the United States Patent and Trademark Office*